May 4, 1965     M. T. DURLOFSKY     3,181,418
PROJECTION APPARATUS

Filed July 25, 1961                               3 Sheets-Sheet 1

INVENTOR.
MEYER T. DURLOFSKY
BY
ATTORNEY

May 4, 1965 M. T. DURLOFSKY 3,181,418
PROJECTION APPARATUS
Filed July 25, 1961 3 Sheets-Sheet 3
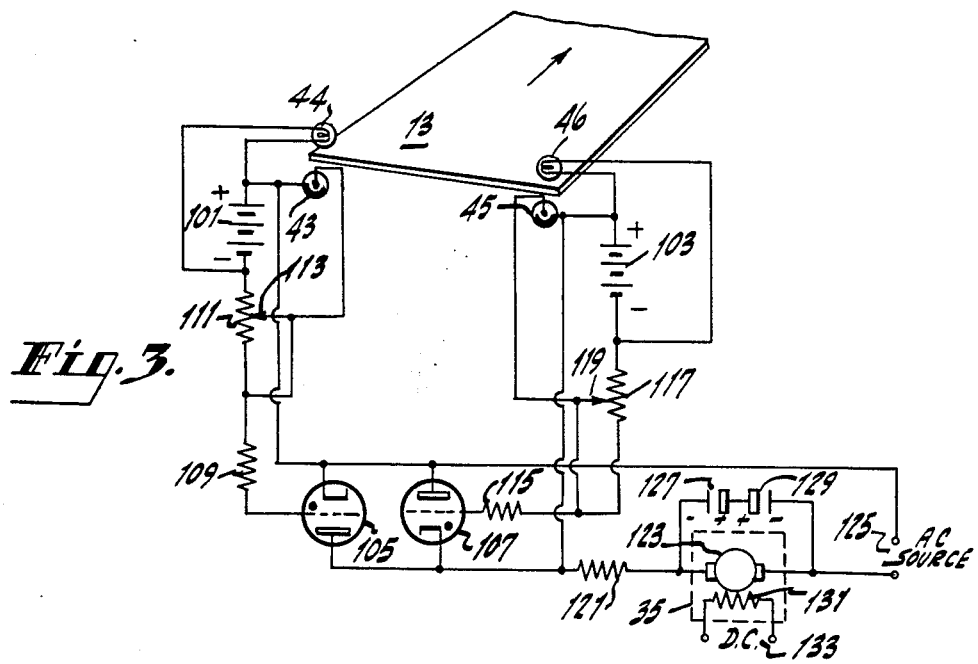
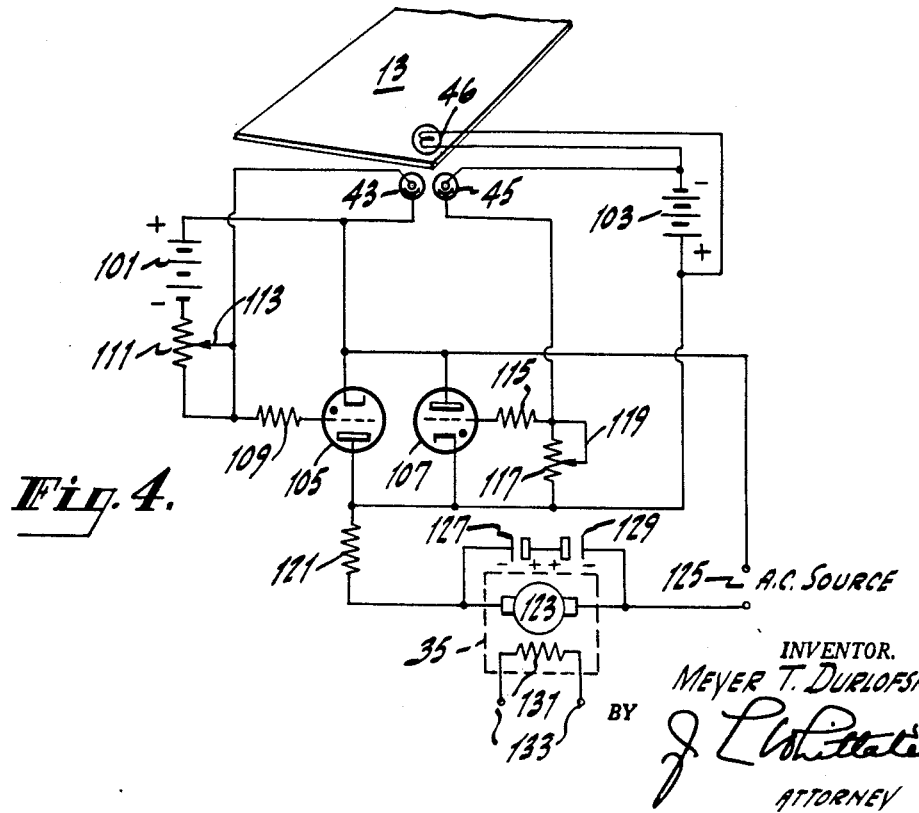
INVENTOR.
MEYER T. DURLOFSKY
BY
ATTORNEY 
United States Patent Office 3,181,418
Patented May 4, 1965

3,181,418
PROJECTION APPARATUS
Meyer T. Durlofsky, Philadelphia, Pa., assignor to Radio Corporation of America, a corporation of Delaware
Filed July 25, 1961, Ser. No. 126,632
8 Claims. (Cl. 88—24)

This invention relates to projection apparatus and more particularly to improved projection apparatus wherein means are provided for centering and/or registering optical images projected onto a photosensitive web.

Some types of optical projection apparatus includes means for transporting an elongated flexible web along a path which includes the focal plane of the projector. The transporting means generally includes one or more drive rollers and one or more idler rollers which support the moving web. When any web passes over such rollers there is a tendency for the web to become displaced transversely with respect to its path. Transverse displacement of the web is undesirable and cannot be tolerated when accurate image registration is required such as, for example, when one image is superimposed upon another. In the latter instance, registration requirements are such that mechanisms incorporated in web feeding apparatus for centering the web do not always provide the desired registration.

Accordingly, it is a general object of this invention to provide improved apparatus for projecting images onto a photosensitive web wherein improved registration alignment between the web and projector is maintained.

It is a further object of this invention to provide improved projection apparatus wherein a photosensitive web can be exposed to a plurality of superimposed images in registry.

It is a still further object of this invention to provide improved projection apparatus including a plurality of optical image projectors for successively exposing a photosensitive web to superimposed images in registry.

These and other objects and advantages are obtained in accordance with this invention by providing an optical image projector movably mounted and having its movement controlled to compensate for any transverse displacement of a photosensitive web. Electrical means are provided for detecting at least one edge of the photosensitive web as it is moved into the focal plane of the projector. This electrical means provides a signal which is indicative of the direction of transverse displacement of the web. The signal is then used, as by means of a servo circuit, to control a reversible motor which in turn controls transverse movement of the projector. Means are also included to provide for movement of the electrical detection means coincident with movement of the projector. Coincident movement of the projector and detection means insures that each exposure of the photosensitive web will produce an image thereon which is accurately centered between the edges of the web or accurately spaced from one edge of the web and thus, when successive exposures are made, provide for registration of the images so produced.

Other objects and advantages appear from the following detailed description and the accompanying drawings wherein:

FIG. 3 is a schematic circuit diagram of a preferred servo circuit for use in the apparatus of FIG. 1; and FIG. 4 is a schematic circuit diagram of an alternative servo circuit for use in the apparatus of FIG. 1.

Similar reference characters are applied to similar elements throughout the drawings.

Figure 1:
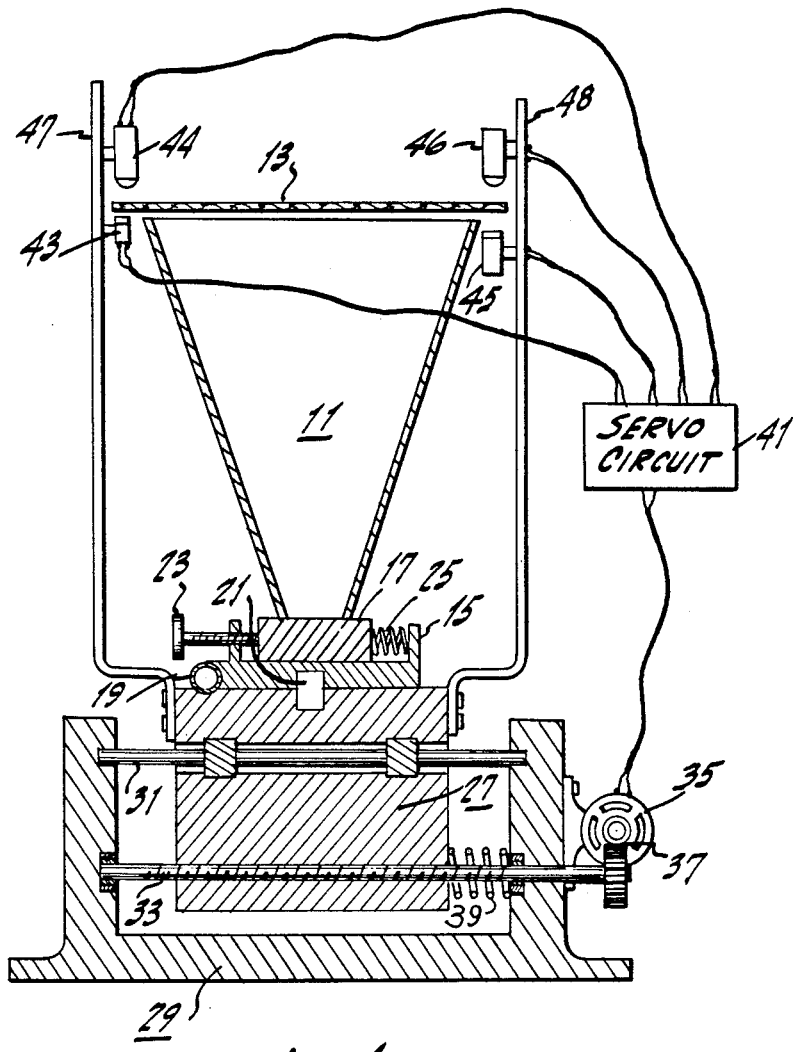
FIG. 1 is a view in elevation, partially in cross section, of an improved projection apparatus in accordance with this invention.

In FIG. 1 there is shown an optical image projector 11 which is disposed to project an optical image upwardly onto a photosensitive sheet or web 13 lying in the focal plane of the projector 1. The mounting of the projector 11 includes a turntable 15 in which the base 17 of the projector 11 is nested. Initial angular adjustment of the projector 11 is provided for by a thumbscrew 19 for rotating the turntable 15 about a center pin 21. Initial lateral adjustment is provided for by a thumbscrew 23 and a counteracting spring 25 by means of which the projector base 17 can be laterally moved in the turntable 15. When the projector 11 is employed to successively expose frames on the web 13 moving through the focal plane of the projector 11, adjustment of the thumbscrews 19 and 23 need only be made if proper orientation of the projector is required at the beginning of a run. Lateral adjustment during successive exposures will be automatically accomplished as described hereinafter.

The projector base 17 is supported on a mounting block 27 which, in turn, is supported for lateral movement within a pedestal 29 by means of at least one slide or guide bar 31 extending through the block 27. Lateral movement of the block 27 is accomplished with a feed screw 33 threaded through the block 27 and coupled to a suitable motor 35 by means of a conventional gear combination 37. To prevent backlash of the block 27 on the feed screw 33 a compression spring 39 is provided between the side of the block 27 and an inner wall of the pedestal 29.

Lateral registration between the photosensitive web 13 and the projector 11 as the web 13 moves into or through the focal plane of the projector is provided for by means of a servo circuit 41 which controls the motor 35 in response to sensing signals derived from a pair of photocells or photodiodes 43 and 45. One photocell 43 and a lamp 44 for illuminating it are mounted on a bracket 47 fastened to the mounting block 27 so that the photocell 43 will move with the block 27. The other photocell 45 and a lamp 46 for illuminating it are mounted on a bracket 48 fastened to the block 27 in a similar manner. The photocells 43 and 45 are spaced apart a distance slightly less than the width of the web 13 which is to be exposed. These photocells 43 and 45 are so disposed adjacent each edge of the web 13 that the web 13, when in its normal path of travel as it moves into the focal plane, will intercept the light from the lamps 44 and 46 preventing both photocells 43 and 45 from being illuminated. In such a case no signal is transmitted to the servo circuit 41 and no rotation of the motor 35 results. If, as the web moves into the focal plane, it is displaced to the left toward the photocell 43, the other photocell 45 will be illuminated sending a signal to the servo circuit 41 which will cause one direction of rotation of the motor 35. Opposite displacement of the web to the right will illuminate the photocell 43 sending a signal to the servo circuit 41 which will cause the motor 35 to rotate in the opposite direction.

Figure 2:
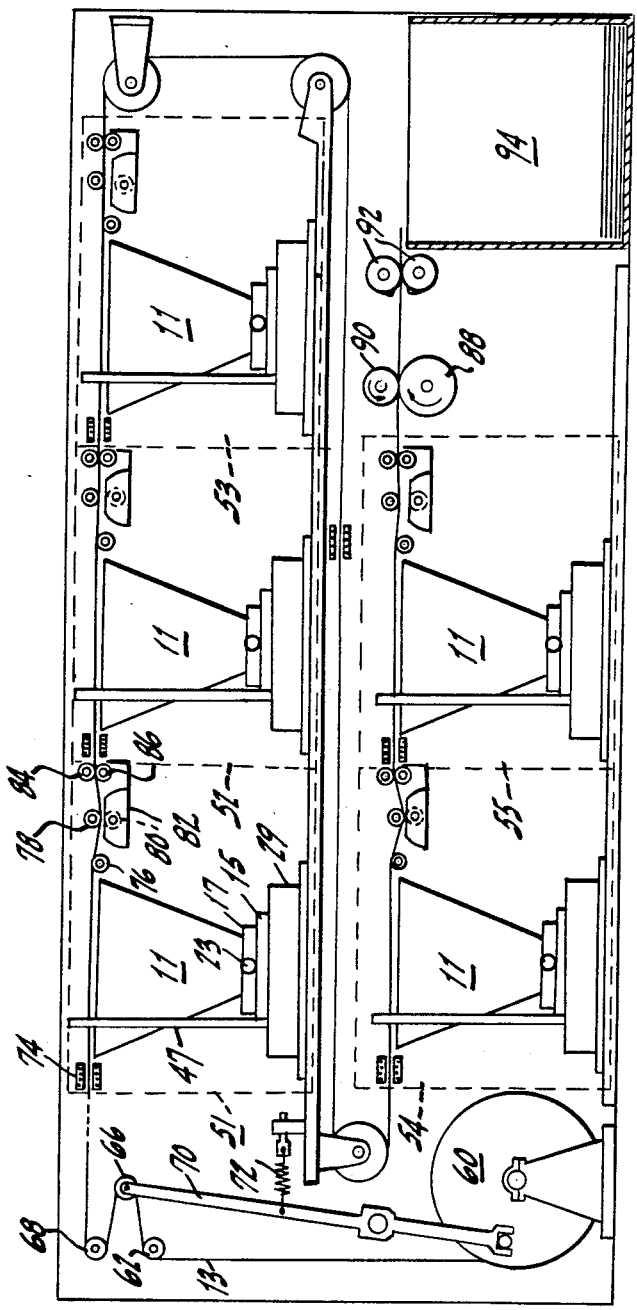
FIG. 2 is a schematic drawing in side elevation of an improved projection apparatus including a plurality of projectors.

In FIG. 2, apparatus is illustrated which is particularly adapted for making color reproductions using electrophotographic techniques. As shown, the apparatus may include five electrophotographic printing stations 51, 52, 53, 54 and 55, each including a projector 11 mounted and servoed as described in connection with FIG. 1. The five station apparatus of FIG. 2 is designed to produce five-color maps from black and white separation positives, one for each color being projected at each station. Two, three or four color reproductions will require a correspondingly lesser number of stations.

In producing color reproductions, a suitable photosensitive medium to be employed is an electophotographic paper such as that described by C. J. Young and H. G. Greig in the RCA Review, December 1954, vol. XV, Number 4, on pages 469 to 484. In the apparatus of FIG. 2 the web 13 comprises such electrophotographic paper. The web 13 is carried on a supply reel 60 from which it is drawn through the first projection station 51. Tension on the web 13 is maintained by passing it in sequence, over an idler roller 62, a tension roller 66 and another idler roller 68. In this way, a loop is formed in the web 13 by means of the tension roller 66 which is carried on a lever arm 70 connected to a spring 72. Suitable brake means (not shown), operating on the supply reel 60, in combination with the tension roller 66 maintain substantially constant tension on the web 13.

As the web 13 passes into the first projection station 51, it passes through a corona generating unit 74 with its photoconductive surface facing downward. The corona generating unit 74 comprises two opposed parallel arrays of fine wires. When opposite potentials of a value sufficient to generate corona are applied to the two arrays the photoconductive surface of the web 13 is negatively charged to a substantially uniform potential. As the charged web 13 moves into the focal plane of projector 11 any lateral displacement thereof is detected and the position of the projector 11 adjusted accordingly as described in connection with FIG. 1.

In the focal plane of the projector, the web 13 is conveniently exposed to an image from a separation positive while the web 13 is still moving. When a light source having an output energy level of about 125 watt-seconds is employed in the projector, exposure can be made with the web 13 moving at speeds up to 16 inches per second with a flash exposure of from 55 to 80 microseconds. Flash exposure can be conveniently controlled by a series of precut holes or slots appropriately spaced along the web 13 and detected photoelectrically to trigger the flash exposure. Upon exposure of the web 13, there is formed upon the photoconductive surface thereon an electrostatic image, the charged areas of which were not exposed to light.

The charge image on the web 13 can be developed into a visible image by many known techniques. In the preparation of multicolor maps, it has been found convenient to produce a visible image on the web 13 by applying thereto a liquid toner composition. Such a composition may comprise, for example, a dilute suspension of colored toner particles in a carrier liquid made up of about equal parts of trichlorotrifluoroethane and a dimethyl polysiloxane having a viscosity of about 2 centistokes. The liquid developer composition can be applied to the electrostatic image on the web 13 by means of a roller or it may be sprayed onto or flowed across the photoconductive surface thereof.

Roller developing means is schematically illustrated in FIG. 2. As shown, the exposed web 13, as it is drawn from the focal plane of the projector 11 in exposure station 51, is carried over an idler roller 76 and under a guide roller 78. A developer roller 80 is rotatably mounted in a tray 82 containing the liquid developer composition and is partially immersed in the composition. The guide roller 78 and the developer roller 80 are positioned one above the other a distance such that the web 13 passing therebetween will not touch the surface of the developer roller 80 but rather will be spaced therefrom a distance of about 0.003 inch. As the developer roller 80 rotates in the tray 82, it carries developer composition on its surface into contact with the photoconductive surface of the web 13 to develop thereon a visible colored image. If desired, he web can next be passed between a pair of pressure rollers 84 and 86 to squeegee excess liquid from the web 13.

The developed web 13 passes from the exposure station 51 and into the next exposure station 52 where it is again charged, exposed and developed in the same manner as it was in exposure station 51. In exposure station 52, the web 13 is exposed to a different separation positive and is developed with a different colored toner from those employed in exposure station 51. By employing five exposure stations 51-55, the same procedure is employed five times with five different separation positives and five differently colored toners to produce a five color map. At each exposure station the projector 11 is automatically servoed into accurate lateral registry with respect to the moving web 13 as described in connection with FIG. 1. In this way, lateral registration of subsequently developed, superimposed images is ensured.

As mentioned heretofore, the web 13 is drawn from the supply reel 60 through the exposure stations 51-55. For this purpose, a power driven capstan 88 and a pressure roller 90 in engagement with the web 13 are rotated to move the web 13 along its path of travel. Once the web 13 is clear of the capstan 88, individual maps can be cut therefrom by a sheeter 92 and stacked in a bin 94.

There are many servo circuits known to those skilled in the art which can provide for control of the motor 35 in FIG. 1. For the sake of completeness, a circuit is illustrated in FIG. 3 which is well suited for providing the function of the servo circuit 41 of FIG. 1. The circuit of FIG. 3 provides for controlling a direct current motor 35 in response to transverse displacement of the moving web 13. At one edge of the normal path of travel of the web 13 a combination of a photocell or photodiode 43 and a lamp 44 are disposed so that, when the web 13 is in its normal path, it will intercept the light beam between the lamp 44 and photodiode 43. A second combination of a photodiode 45 and a lamp 46 are disposed in a similar manner at the opposite edge of the path. The photodiodes are spaced apart a distance almost equal to the width of the web 13. Thus, if the web 13 is in its normal path of travel no light will fall on either of the photodiodes 43 and 45. If the web 13 is displaced to the right toward the photodiode 45, light will fall on the other photodiode 43 and vice versa. One or more sources of direct current potential such as the batteries 101 and 103 are provided for powering the lamps 44 and 46 and the photodiodes 43 and 45 and the circuit.

The circuit of FIG. 3 also includes a pair of thyratron tubes 105 and 107 which are connected in parallel with the cathode of one coupled to the plate of the other. Preferably the thyratrons 105 and 107 are of the type having isolated heater windings to prevent any interaction between them. One thyratron 105 has its grid connected to the cathode of the first photodiode 43 through an isolation resistor 109. The grid of the thyratron 105 is connected for bias through the isolation resistor 109 and through a bias resistor 111, variable by means of an adjustable tap 113 thereon to the negative terminal of a D.C. (direct current) voltage supply 101. In a similar manner, the other thyratron 107 grid is connected to the cathode of the second photodiode 45 through an isolation resistor 115. The grid of the thyratron 107 is connected for bias through the isolation resistor 115 and through a bias resistor 117, variable by means of an adjustable tap 119 thereon to the negative terminal of a D.C. (direct current) voltage supply 103.

The filament of the first lamp 44 is connected across the D.C. source 101 and the filament of the second lamp 46 is connected across the D.C. source 103 to light these lamps. The plate of the thyratron 107 and the cathode of thyratron 105 are connected together and to the positive terminal of the D.C. source 101. The positive terminal of the D.C. source 101 is connected to the anode of the photodiode 43 and the positive terminal of the D.C. source 103 to the anode of the second photodiode 45. The plate of thyratron 105 and the cathode of thyratron 107 are also connected to the positive terminal of the D.C. source 103. Note that the thyratrons are connected as parallel branches of a circuit in series with the motor 35. The isolation resistors 109 and 115 protect the photodiodes 43 and 45 in the event of grid current flow in the circuit branches. The plate of thyratron 105 and the cathode of thyratron 107 are connected through a current limiting resistor (or inductor) 121 to one terminal of the armature 123 of the motor 35. The other terminal of the armature 123 is connected to one side of an alternating current source 125, the other side of which source is connected to the plate of thyratron 107 and the cathode of thyratron 105.

One or more capacitors 127 and 129 are connected across the armature 123 for purposes which will hereinafter become apparent. The capacitors 127 and 129 may be replaced by a single capacitor of the non-polarized type. However, greater capacitance without a corresponding increase in size can be realized by connecting two electrolytic capacitors in series, as shown with the polarity of one in opopsition to the polarity of the other.

As depicted, the field winding 131 of the motor 35 is connected to a separate direct current source 133. If desired, the field winding 131 can be connected in series with the A.C. source 125 (instead of to the direct current source 133) and the current limiting resistor 121. In this case the armature 123 is connected to the D.C. source 133.

In operation, the circuit of FIG. 3 functions in the following manner. Displacement of the web 13 to the left in the direction of the photodiode 43 prevents light from illuminating it so that its resistance remains high and most of the voltage from the battery 101 appears across it as a bias voltage. The magnitude of this voltage is initially adjusted by the tap 113 on the bias resistor 111 to be greater than the critical value of the thyratron 105 so that thyratron 105 will remain in a cut-off condition. At the same time, the aforesaid displacement of the web 13 to the left causes light to impinge on the other photodiode 45 decreasing its resistance to a value such that the bias of thyratron 107 is less than the critical cut-off value. Thus, thyratron 107, now biased to permit conduction, will do so as each negative half cycle of A.C. voltage is applied to its cathode.

When thyratron 107 conducts, direct current pulses will flow through the limiting resistor 121 and the armature 123 of the motor 35, causing rotation thereof in one direction. The limiting resistor 121 in combination with the capacitors 127 and 129 forms a low-pass filter network which smooths the pulsating direct current supplied to the armature 123. In addition, the value of the limiting resistor 121 determines the voltage drop across the armature 123 and therefor the speed of the motor 35.

Transverse displacement of the web 12 to the right in a direction to interrupt the light impinging on photodiode 45 and to cause light to impinge on the other photodiode 43 will increase the bias of thyratron 107 to a value above its critical cut-off value, and will decrease the bias of thyratron 105 below its critical value. When this happens, positive half-cycles of potential applied to the plate of thyratron 105 will cause that tube to conduct and, as soon as a positive half-cycle appears at the cathode of thyratron 107 that tube will be cut-off. In this way, pulses of direct current will flow through the armature 123 of motor 35 in the opposite direction and will reverse the rotation thereof.

From the foregoing, it is obvious that, so long as the moving web 13 remains in its normal path, both of the thyratrons 105 and 107 will remain cut-off and no current will flow through the armature 123 of the motor 35. The circuit of FIG. 3 includes another advantageous function in the event that the web 13 should break. Should this happen, both photodiodes 43 and 45 will be illuminated and both thyratrons 105 and 107 will conduct alternately resulting in the application of A.C. potential across the armature 123. With A.C. across the armature 44, no rotation results. However, the armature 123 can become overheated which may cause damage thereto. Damage to the motor 35 is prevented by the capacitors 127 and 129 which will limit the amount of alternating current flowing through the armature 123 by by-passing some of it.

The following table sets forth one example of suitable components which can be used in the circuit of FIG. 1.

Photodiodes 43 and 45 (each) ___ 1N77B.
Thyratrons 105 and 107 (each) ___ 2D21.
D.C. sources (batteries) 101 and
  103 (each) _____ 9 v.
Resistors 111 and 117 (each _____ 10,000 to 100,000Ω.
Resistors 109 and 115 (each) _____ 100,000Ω.
Resistor 121 _____ 500Ω, 10 w.
Capacitors 127 and 129 (each) ____ 10 μd., 150 v. D.C.
Motor 35 _____ 110 v. D.C., 100 ma.

Under some circumstances it may be desirable to provide for servo control of the motor 35 of FIG. 3 by detecting only one edge of the moving web 13. A circuit for this purpose is illustrated in FIG. 4 and comprises a modification of the circuit of FIG. 3.

In FIG. 4, the lamp 44 of FIG. 3 has been eliminated and the photodiodes 43 and 45 have been positioned adjacent one another. With the photodiodes so positioned, the web 13 in its normal path of travel will prevent illumination from the lamp 46 from falling on the photodiode 43 while under the same conditions the other photodiode 45 will be continuously illuminated. In order that illumination of photodiode 45 will cut off its associated thyratron 107 rather than cause conduction therethrough, the bias resistor 117 is connected in series between the isolation resistor 115 and the cathode of the thyratron 107 and the photodiode 45 coupled thereto by means of the adjustable tap 119. With the photocell 45 conducting and the photocell 43 non-conducting, both thyratrons 105 and 107 will be cut-off. When photocell 43 conducts, its associated thyratron 105 will conduct and, when photocell 45 is cut-off its associated thyratron 107 will conduct. In all other aspects, the circuits of FIGS. 3 and 4 function in the same manner with but one exception: the circuit of FIG. 4 includes no provision for control of the motor 35 in the event of a break in the web 13. Should this occur, both photodiodes 43 and 45 will be illuminated and one thyratron 105 will conduct causing rotation of the motor 35. Thus, with the circuit of FIG. 4, it may be desirable to provide some means, manual or automatic, to disconnect the motor 35 in the event the web 13 should break.

What is claimed is:

1. Apparatus for projecting light images on a photosensitive web comprising an optical image projector, means for moving said web into the focal plane of said projector, a mounting base for said projector, said base being supported for movement in a direction transverse to the direction of movement of said web, a reversible motor for controlling said movement of said base, means for detecting transverse displacement of at least one edge of said web with respect to said projector to provide a signal indicative of the direction and degree of said transverse displacement of said web, signal utilization means coupling said detecting means to said motor to control operation of said motor in response to said signal and means for providing transverse movement of said detecting means coincident with said movement of said base.

2. Apparatus for projecting light images onto a photosensitive web comprising a plurality of optical image projectors, means for moving said web along a predetermined path including the focal plane for each of said projectors, a mounting base for each of said projectors supported for movement in a direction transverse to said path, a reversible motor coupled to each said base for controlling said transverse movement thereof, detection means supported for coincident movement with each said base and disposed adjacent said path for detecting transverse displacement of said web with respect to said projector to produce a signal indicative of the direction and degree of said transverse displacement and means coupling each said detection means to a respective motor to control operation thereof in response to said signal.

3. Apparatus for projecting light images onto a photosensitive web comprising an optical image projector, means for moving said web into the focal plane of said projector, a mounting base for said projector supported for movement in a direction transverse to the direction of movement of said web, a reversible electric motor, means coupling said motor to said base for converting rotation of said motor into said transverse motion of said base, photoelectric detection means disposed adjacent at least one edge of the path of travel of said web for detecting transverse displacement of said web with respect to said projector and for providing electrical signals indicative of the direction and degree of said transverse displacement, said detection means being supported for transverse movement coincident with transverse movement of said base, and a servo circuit responsive to said signals for controlling rotation of said motor.

4. Apparatus for projecting light images onto a photosensitive web comprising: an optical image projector; means for moving said web into the focal plane of said projector; a first photoelectric means adjacent one edge of the normal path of travel of said web into said focal plane, said first photoelectric means being responsive to transverse displacement of said web in one direction with respect to said projector to produce a first electrical signal; second photoelectric means adjacent the opposite edge of said path responsive to transverse displacement of said web in the opposite direction with respect to said projector to produce a second electrical signal; means for mounting said projector for reversible movement in a direction transverse to said path; a reversible motor for producing said movement of said projector; signal utilization means coupling both said photoelectric means to said motor to produce rotation of said motor in one direction in response to said first electrical signal and opposite rotation of said motor in response to said second electrical signal; and means for providing transverse movement of both said photoelectric means coincident with said movement of said projector.

5. Apparatus for projecting light images onto a photosensitive web comprising: an optical image projector; means for moving said web through the focal plane of said projector; a mount for supporting said projector; slide means for supporting said mount for movement in a direction transverse to the direction of movement of said web; feed screw means for moving said mount on said slide means; a reversible motor for driving said feed screw means; a first photoelectric device adjacent one edge of the normal path of travel of said web; a first electric lamp for illuminating said first photoelectric device; a bracket attached to said mount and supporting said first photoelectric device and said first lamp; a second photoelectric device adjacent the other edge of said path; a second electric lamp for illuminating said second photoelectric device; a bracket attached to said mount and supporting said second photoelectric device and said second lamp; said photoelectric devices being positioned apart a distance such that when said web is in its normal path of travel neither device will be illuminated and when said web is transversely displaced one of said devices will be illuminated; and, a servo circuit coupling said photoelectric devices to said motor, said circuit being responsive to illumination of said first photoelectric device to produce one direction of rotation of said motor and responsive to illumination of said second photoelectric device to produce rotation in a reverse direction.

6. In electrophotographic apparatus including means for producing a substantially uniform electrostatic charge on a photoconductive insulating surface, means for exposing said surface to a projected light image, means for developing a visible image on said surface and means for moving said surface past said charging means through the focal plane of said exposing means and past said developing means; the combination therewith of: a mounting base for said exposing means, said base being supported for movement in a direction transverse to the direction of movement of said surface; means for detecting transverse displacement of at least one edge of said surface with respect to said mounting base to provide a signal indicative of the direction of transverse displacement of said surface; a reversible motor for controlling movement of said base; signal utilization means coupling said detecting means to said motor to control operation of said motor in response to said signal and means for providing transverse movement of said detecting means coincident with said movement of said base.

7. Electrophotographic apparatus comprising: corona generating means for producing a substantially uniform electrostatic charge on a photoconductive insulating surface; an optical image projector; developer means for applying finely-divided toner to said surface; means for moving said surface past said corona generating means, through the focal plane of said projector and past said developer means; a mounting base for said projector supported for movement in a direction transverse to the movement of said surface; a reversible motor mechanically coupled to said base to control transverse movement thereof; at least one detection means positioned adjacent at least one edge of the normal path of travel of said surface as it moves from said corona generating means into said focal plane; said detection means being adapted to produce a first electrical signal in response to transverse displacement of said surface from said path in one direction and to produce a second electrical signal in response to transverse displacement of said surface in the opposite direction; signal utilization means coupling said detection means to said motor to produce rotation thereof in one direction in response to said first electrical signal and in the opposite direction in response to said second electrical signal; and, means for producing transverse motion of said detection means coincident with transverse movement of said base.

8. Electrophotographic apparatus for producing a plurality of visible images on the photoconductive insulating surface of an electrophotographic web; said apparatus comprising a plurality of printing stations each including corona generating means for producing an electrostatic charge on said surface, a projector for exposing said surface to a light image, and a developer means for applying finely-divided toner to said surface; means feeding said web through each of said stations in succession said web within each station moving past said corona generating means, through the focal plane of said projector and past said developer means; a mounting base at each station for said projector supported for movement in a direction transverse to the direction of movement of said web; a reversible motor at each station mechanically coupled to said base to control transverse movement thereof; a first photoelectric device at each station positioned adjacent one edge of the normal path of travel of said web; a second photoelectric device at each station adjacent the opposite edge of said path; means for illuminating each of said photoelectric devices; supporting means for said photoelectric devices for holding them in spaced apart relationship a distance such that when said web is in its normal path of travel it will prevent said devices from being illuminated and when said web becomes transversely displaced from said path in one direction said first photoelectric device will become illuminated and when said web becomes transversely displaced in the opposite direction said second photoelectric device will become illuminated, said supporting means being coupled to said base for coincident movement therewith; and, a servo circuit at each of said stations coupling said photoelectric devices to said motor to produce rotation thereof in one direction in response to illumination of said first photoelectric device and in the opposite direction in response to illumination of said second photoelectric device.

References Cited by the Examiner
UNITED STATES PATENTS

| | | | |
|---|---|---|---|
| 2,514,985 | 7/50 | Banner | 88—14 |
| 2,563,892 | 8/51 | Waller et al. | 88—24 X |
| 2,674,151 | 4/54 | Garrett et al. | 88—14 |
| 2,777,069 | 1/57 | Saeman. | |
| 2,810,316 | 10/57 | Snyder | 88—14 |
| 2,941,087 | 6/60 | Blumberg et al. | 88—14 X |
| 2,986,466 | 5/61 | Kaprelian | 88—24 X |
| 3,054,323 | 9/62 | Davidson | 88—14 |

NORTON ANSHER, *Primary Examiner.*

EMIL G. ANDERSON, *Examiner.*